Nov. 26, 1968    G. H. CARDIFF    3,412,530
ELECTROSTATIC AIR FILTER STRUCTURE
Filed Feb. 6, 1967    3 Sheets-Sheet 1

INVENTOR.
GEORGE H. CARDIFF
BY *John H. Widdowson*
*Phillip A. Rein*
ATTORNEYS

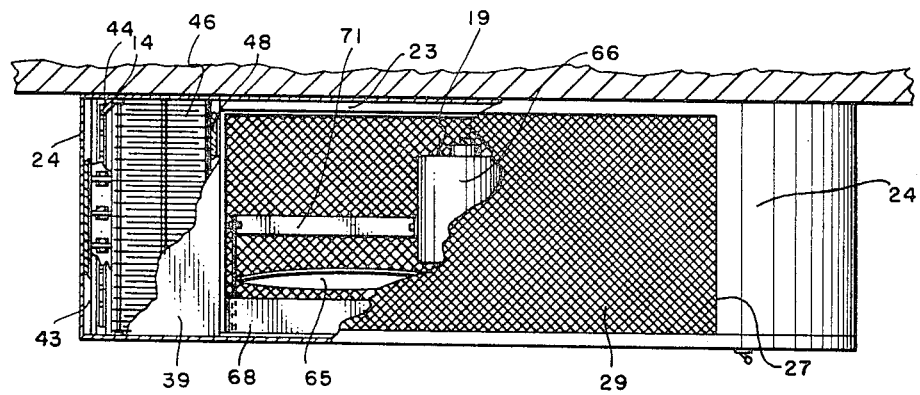
FIG. 5
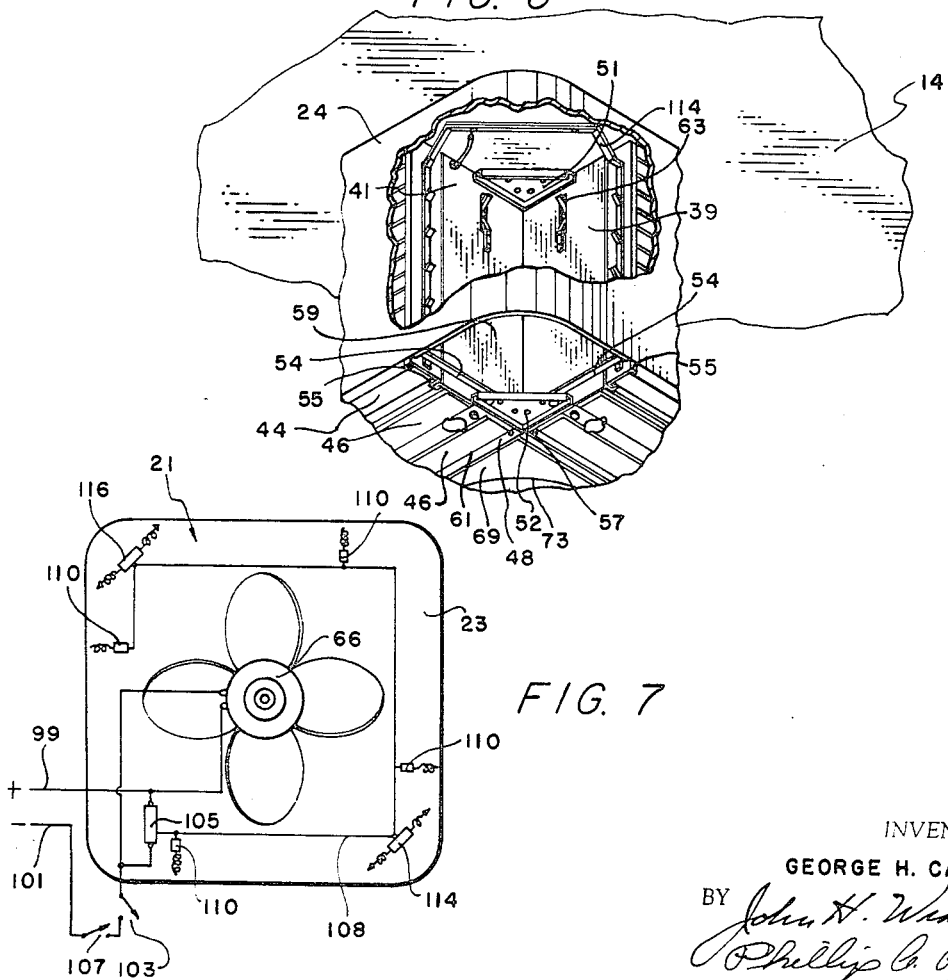
FIG. 6
FIG. 7
INVENTOR.
GEORGE H. CARDIFF
BY
ATTORNEYS

United States Patent Office 3,412,530
Patented Nov. 26, 1968

3,412,530
ELECTROSTATIC AIR FILTER STRUCTURE
George H. Cardiff, 725 E. 37th St. N.,
Wichita, Kans. 67219
Filed Feb. 6, 1967, Ser. No. 614,276
3 Claims. (Cl. 55—126)

ABSTRACT OF THE DISCLOSURE

A compact, electrostatic air filter having a plurality of air inlet openings and a common forced air discharge outlet, a plurality of modular electrostatic precipitator cells each individually operable to separate foreign particles from a given air flow therethrough, each cell having ionizer units and particle collector units readily removable for service and maintenance with a minimum amount of time and effort required.

---

Numerous types of electrostatic air filters are known to the prior art utilizing ionizing units to electrically charge foreign particles in the air and collecting units having a plurality of plates oppositely charged with a high voltage to attract the particles in the air flow therethrough resulting in the filtering action. The prior art devices are limited in their compactness and filtering capacity and are not readily operable for high flow rates to filter out smoke, tars, nicotine, and the like. After a period of time, the filtering of air having tars, resins, oils, and nicotine content results in the collection thereof on the collector plate units and such foreign materials are difficult to remove because of the closeness of the plates and the type of material. Therefore, it is desirable to present a structure wherein the collector plates are readily removable for the cleansing thereof. In the conventionally available electrostatic air filters, the collector plates can only be cleansed by steam or the like in the assembled conditions which is hard on the equipment plus being expensive and very bothersome to achieve.

In a preferred specific embodiment of the invention, the electrostatic air filter structure includes a housing assembly having a plurality of air inlets and a common air outlet; motor means providing forced air flow through the air inlets; and a plurality of modular electrostatic precipitator units, each operably associated with respective ones of the air inlets. The electrostatic precipitator units are preferably constructed in series, with a pre-filter screen to remove large dust particles and lint from the air; an ionizer unit to charge the foreign particles in the air flow moving therethrough; a particle collector or separating unit to attract the charged particles in the air flow; and a final conglomeration filter positioned just prior to the air outlet. The ionizer units include a plurality of spaced, parallel filament wires operable to electrically charge foreign particles in the air flowing thereby. The collector unit is provided with a plurality of spaced plates charged with a high voltage and interleaved grounded plates thereby causing charged particles from the filament wires to be repulsed by the charged plates and to collect on the grounded plates. The ionizer units are frictionally engageable with the housing assembly to hold the same in position whereas spring clip members are engageable with the collector units to releasably secure the same to the housing assembly. An electrical supply means is operably connected to filament wires and the spaced plates to provide a high voltage, low amperage current thereon to electrically charge the foreign particles in the air while maintaining the same safe for household operation. The ionizer units and collector units are readily removable from the housing assembly for economical repair and maintenance.

Accordingly, it is an object of this invention to provide a new and novel electrostatic air filter structure overcoming the above-mentioned disadvantages of the prior art devices.

Another object of this invention is to provide a compact electrostatic air filter structure that is readily connectible to walls, ceilings, and the like operable to provide a maximum amount of electrostatic air filtering with a minimum amount of space required therefor.

One other object of this invention is to provide an electrostatic air filter structure having a plurality of air inlets supplying air to a common air outlet and a plurality of modular electrostatic precipitator units, each operably associated with a respective air inlet thereby providing a plurality of individual air filtering assemblies for the utmost in efficiency and economy.

One further object of this invention is to provide an electrostatic air filter structure having a plurality of modular electrostatic precipitator units, each having an ionizer unit and a collector unit readily removable therefrom for cleansing the same in a conventional dishwasher or the like.

Still, another object of this invention is to provide an electrostatic air filter structure that is compact in size, economical to manufacture, inexpensive to operate, and providing the utmost safety in usage.

Still, one other object of this invention is to provide an electrostatic air filter structure that is readily attachable to a ceiling or the like operable with a high voltage, low amperage electrical supply so as to be safe and economical for household operation.

Various other objects, advantages, and features of the invention will become apparent to those skilled in the art from the following discussion, taken in conjunction with the accompanying drawings, in which:

FIG. 5 is a side elevational view of the electrostatic air filter structure of this invention having portions thereof broken away for clarity;

FIG. 6 is an enlarged fragmentary perspective view of a corner portion of the electrostatic air filter structure of this invention; and FIG. 7 is a schematic diagram illustrating the electrical circuit means of the electrostatic air filter structure of this invention.

Figure 1:
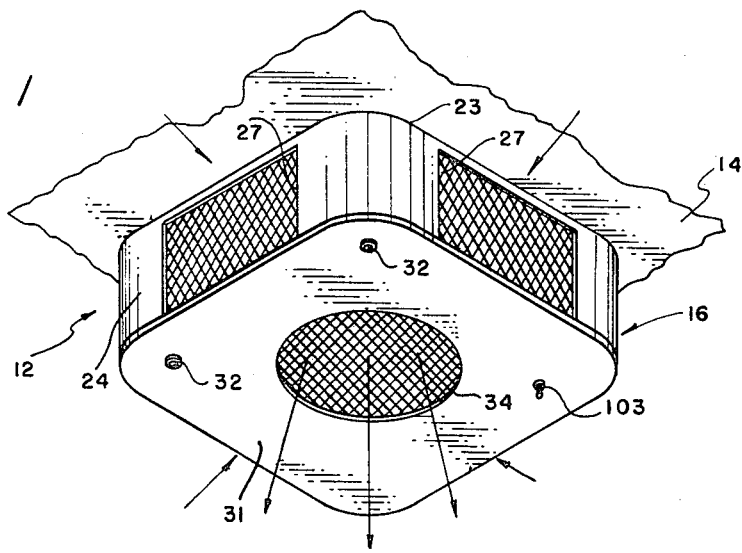
FIG. 1 is a perspective view of the electrostatic air filter structure of this invention illustrated as being ceiling mounted.

The following is a discussion and description of preferred specific embodiments of the electrostatic air filter structure of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, the electrostatic air filter structure of this invention, indicated generally at 12, is illustrated as secured to a ceiling 14 and operable to receive air thereabout from adjacent the ceiling 14 and to discharge the cleansed filtered air downwardly thereby providing efficient air circulation. The electrostatic air filter structure 12 includes a housing means 16; a plurality of modular electrostatic precipitator means 18 operable to receive and cleanse an air-particule mixture; fan means 19 for conveying air through the modular electrostatic precipitator means 18; and an electrical circuit means 21 (FIG. 7) connected to the fan means 19 and also to the modular electrostatic precipitator means 18 to supply high voltage, low amperage, current thereto for reasons to become obvious.

Figure 2:
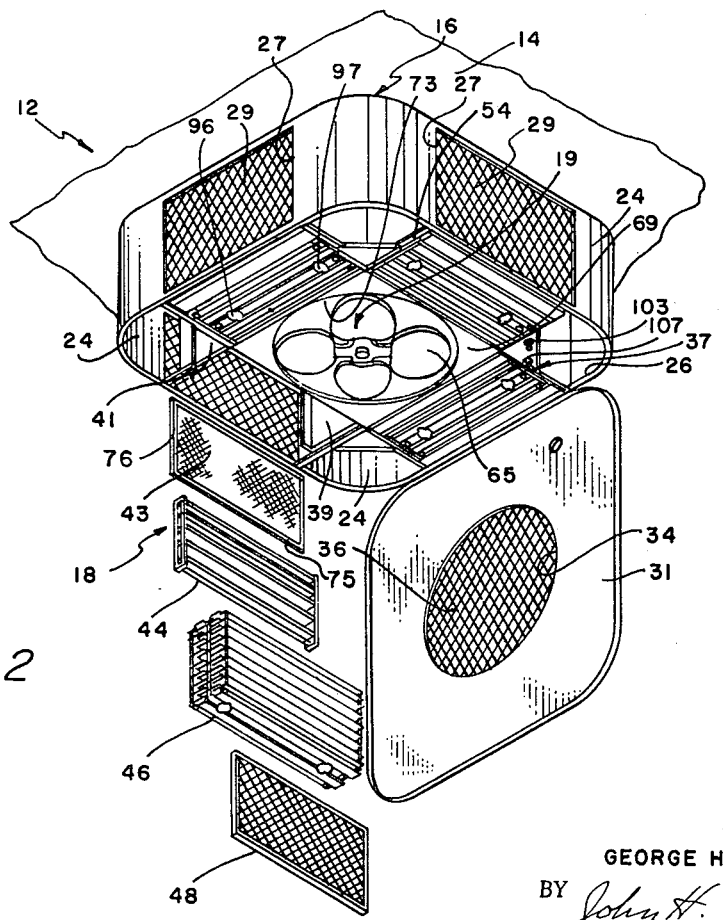
FIG. 2 is a perspective view of the electrostatic air filter structure of this invention in the open condition having one of the modular electrostatic precipitator units exploded downwardly for purposes of clarity.

More specifically, as shown in FIGS. 1 and 2, the housing means 16 is of a substantially rectangular box shape having a support base or wall 23 with downwardly depending integral sidwalls 24 forming the periphery of an enlarged entrance opening 26. The sidewalls 24 are respectively formed with rectangular air inlet opening 27 extended substantially the width and length thereof having closure grates 29 thereacross. A closure lid member 31 is hinged to one of thesidewalls 24 and selectively movable from the open position of FIG. 2 to the closed or sealed position to FIG. 1 and secured thereto as by lock bolts 32. Centrally of the closure lid member 31 is a circular air outlet opening 34 covered with a protective grate 36. It is obvious that the electrostatic air filter structure 12 can be secured to the ceiling 14 as by a plurality of bolt members extended through the support base 23, can be mounted on a sidewall in a given room, or secured to a special support pedestal (not shown) as desired.

In this preferred embodiment of the electrostatic air filter structure 12 of this invention, four of the identical modular electrostatic precipitator means or units 18 are utilized, each receiving air through a respective one of the inlet openings 27. Each modular electrostatic precipitator means 18 includes a frame assembly 37 secured to the sidewalls and the support base 23 having spaced end walls 39 and 41 adapted to support in series, a pre-filter member 43; a charger or ionizer unit 44; a particle collector unit or cell 46; and a conglomeration filter member 48. Adjacent ones of the pairs of end walls 39 and 41 are joined to common right triangular shaped upper and lower gusset plates 51 and 52 as by riveting, welding, or the like. Additional rigidity is provided by strap members 54 connected to the lower gusset plates 52 and adjacent portions of the respective sidewalls 24 plus securing the upper gusset plates 51 to the support base 23 as by bolts or the like (FIG. 6).

As shown in FIG. 6, the end walls 39 and 41 are constructed of a sheet material having an outer turned edge 55 adapted to receive and anchor the ionizer units 44 thereto. A second flange portion or edge 57 on each sidewall defines an enlarged U-shaped main portion 59 adapted to contain a respective collector unit 46 therein; and an inner turned edge 61 cooperates with the flange portion 57 so as to hold the conglomeration filter member 48 therebetween as will become obvious. Each of the end walls 39 and 41 has a clip member 63 secured thereto operable to engage and hold the respective collector unit 46 thereto as will be explained.

The fan means 19 includes a conventional air circulation structure having an output shaft 63 connected to a propeller structure 65 driven by an electric motor 66. A fan support frame 68 has a central base 69 with the corners thereof secured to the adjacent end walls 39, 41, and a bracket member 71 is secured to the electric motor 66 to support the same. It is seen that the central base 69 has an enlarged circular central opening 73 to direct air in the proper direction for discharge through the outlet opening 34 in the closure lid member 31.

Referring to FIG. 2, the pre-filter members 43 includes rectangular frames 75 having filter material such as woven fiberglass, wool fibers, etc. mounted therein. The opposite upright sidewalls 76 of the frames 75 are frictionally engageable with the portions of the sidewalls 24 adjacent to the rectangular opening 27 to hold the same in overlapping relationship thereto.

Figure 3:
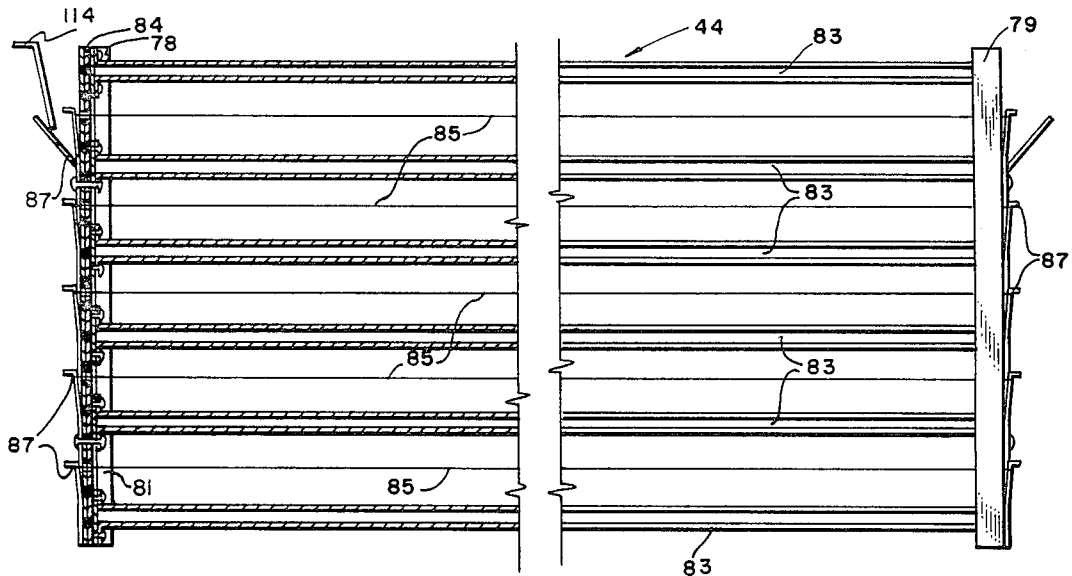
FIG. 3 is a foreshortened enlarged elevational view of an ionizer unit of the electrostatic air filter structure of this invention illustrating the same as contacting electrical spring members to provide current thereto.

As shown in FIGS 2 and 3, each ionizer unit 44 is provided with a support frame 78 having upright end posts 79 and 81 interconnected by parallel support members 83 of U-shape in transverse cross section. Intermediate of each pair of the support members 83 and secured to insulated strips 84 mounted on the end posts 79 and 81 are elongated filament wires 85. In turn, the filament wires 85 have opposite ends secured to conductive tab members 87 mounted on the end posts 79 and 81 in an overlapping relationship to each other to form interconnected conduits up the outer surfaces of the end posts 79 and 81. The support frame 78 is mounted between the first turned edge 55 and the sidewall 24 in frictional engagement therewith with the uppermost one of the tab members 87 extended laterally and supplied with electrical energy transmitted through the conduits to energize the filament wires 85 as will be explained.

Figure 4:
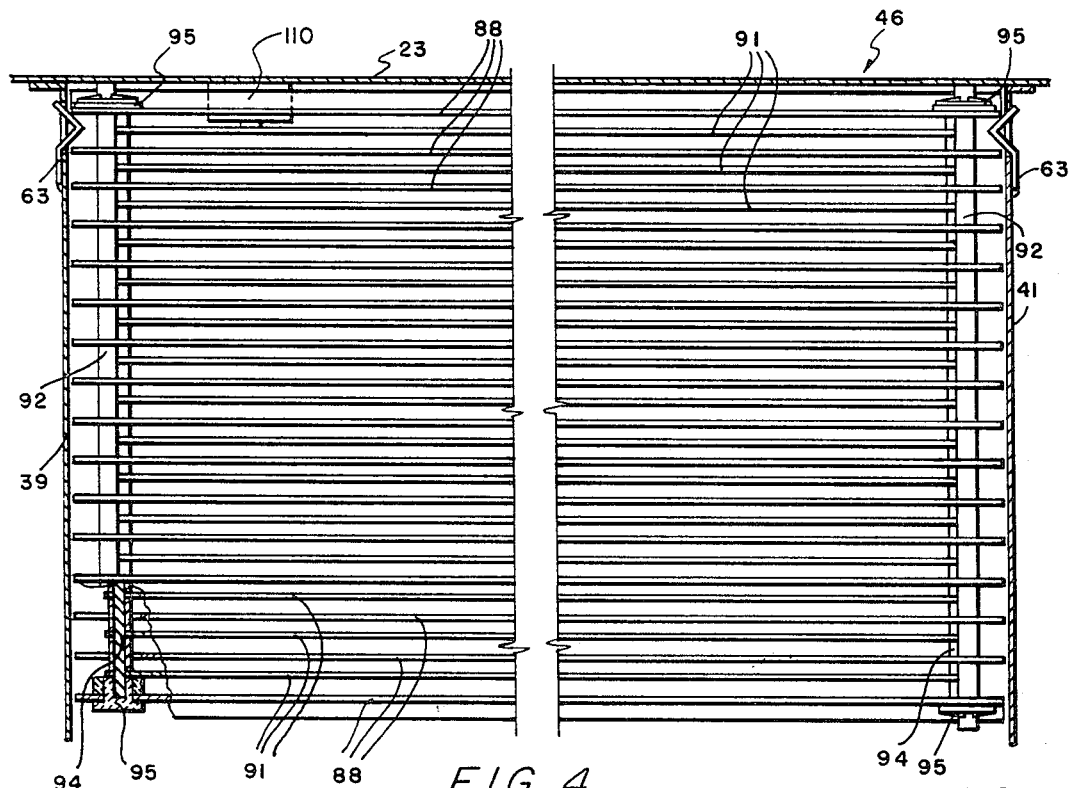
FIG. 4 is an enlarged foreshortened elevational view of a collector unit of the electrostatic air filter structure of this invention illustrating the same as mounted within the outer housing means.

As shown in FIGS. 2 and 4, each collector unit or cell 46 consists of a first group of conductive electrodes in the form of parallel plates 88 in conjunction with a second group of electrodes in parallel plate members 91. These groups of plates 88 and plate members 91 are interleaved with the plate members 91 being somewhat shorter than the plates 88. All the plates 88 are secured together however insulated from adjacent ones by upright corner members 92. Central support posts 94 are interconnecting the plate members 91 with proper spacing from the plates 88 in the form of an insulated comb structure. The posts 94 are connected to upper and lower ones of the plates 88 by insulating members 95. The upper and lower ones of plates 88 are provided with pairs with circular openings 96 and 97 therethrough so that the electrical contact can be readily made therethrough to the plate members 91 as will be explained. When the collector units 46 are mounted within the respective frame assembly 37, the plate members 91 are provided with electrical energy of high voltage and low amperage and the plates 88 are grounded to the housing means 16 by the clip members 63 and the foreign particles within the air flow therethrough are collected on the grounded plates 88 and repulsed by the charged plate members 91 thereby defining collecting zones between the plate members 91 and the plates 88.

The last element of each modular electrostatic precipitator unit 18 is the conglomeration filter member 48 constructed of a synthetic fiber material adapted to provide a fine charcoal type filtering structure for filtering out any minute particles that might have escaped through the respective precipitator means 18 such especially occurring when the collector units 46 have become covered with foreign particles and must be removed and cleansed as will be explained.

In order to supply electrical energy to the electrostatic air filter structure 12, the electrical circuit means 21, ilustrated in FIG. 7, includes inlet conductors 99 and 101 connected to a standard 120 volt outlet circuit and being fed through an on-off switch 103 into a transformer 105. Another switch 107 connected to the conductor 101 is closed by the lid member 31 and is opened when the lid member 31 is raised thereby providing a safety feature to deenergize the circuit means 21 whenever the lid member 31 is opened. The housing means 16 is grounded and the transformer 105 operates to produce a 6,000 volt D.C. output with an amperage of approximately 2 ma. It is seen that this output is fed by a conductor 108 within the periphery of the support base 23 and having a plurality of spaced contacts thereon. More particularly, four spaced spring loaded contacts 110 are secured to the conductor 108 in a particular relationship so as to be engageable with the plate member 91 of the respective collector units 46 when the same is pressed thereagainst. Also, the clip members 63 are engageable with the plate 88 of the collector units 46 to ground the same through the similarly grounded housing means 16. The conductors 99 and 101 are connected through the on-off switch 103 to the motor 66 for operation thereof.

The conductor 108 is also connected to a pair of spaced leaf spring contacts 114 and 116 which are engageable with the ionizer units 44 when the same are placed within the frame assembly 37. As shown in FIG. 3, the leaf spring contacts 114 and 116 are engageable with outwardly extended ones of the upper tab members 87 to provide the electrical energy therethrough to charge the filament wires 85 with the high voltage, low amperage current.

In the use and operation of the electrostatic air filter structure 12 of this invention, the support base 23 is secured to the ceiling 14 in a conventional manner as by bolt members and the electrical circuit means 21 is provided with a standard 110 A.C. electric supply as found in conventional outlets in the homes of today. On energizing the on-off switch member 103, and closing of the switch 107, it is obvious that the fan motor 66 is energized to pull air through the plurality of air inlets 27, and discharge the same downwardly through the air outlet opening 34 in the closure lid 31. This provides a highly efficient air circulation through the air filter structure 12 to remove, for example, the impurities in smoke laden air adjacent the ceiling 14 for the rapid cleansing thereof.

It is seen the electrical circuit means 21 provides the high voltage, low amperage D.C. energy across the filament wires 85 to charge the foreign particles contained within the air moving through the air inlets 27 so that same are charged before moving into the respective collector units 46. The plates 88 and the plate members 91 are oppositely charged so that the charged particles within the air supply moving between the parallel plates 88 and plate members 91 provide for (1) repelling the particles by the positive charged plate member 91 and (2) the grounded plates 88 attract the same thereby providing for removal of the particles in the air and the collection thereon upon the plates 88. It is obvious that after a certain period of time, the collector units 46 become in need of maintenance as the plates become covered with nicotine, oils, resins, tars, and the like and must be removed for cleansing purposes. On opening the closure lid 31, each entire modular electrostatic precipitator means 18 is de-energized and removable for cleansing purposes. More particularly, the collector units 46 most frequently require cleansing and can be readily removed on movement downwardly as the clip members 63 are spring biased into engagement therewith and can be disengaged on downward movement thereof. It is obvious that the pre-filter members 43 and the conglomeration filter members 48 can be removed for cleansing as required as well as the ionizer units 44 in a conventional household dishwasher. Also, the units are of light weight and can be readily removed as by a housewife for cleansing purposes and reassembled in an easy manner so that the same is easily cleansed resulting in its operation in a highly efficient manner at all times.

It is seen that the eletcrostatic air filter structure of this invention provides a compact, highly efficient structure easily mountable and usable to efficiently and effectively remove particles from air within a given area by electrostatic means. It is obvious that the electrostatic air filter structure of this invention is economical to operate, highly efficient in filtering use, and inexpensive to manufacture making the same economically feasible for home usage.

As will be apparent from the foregoing description of preferred embodiments of the applicant's air filtering structure, relative simple and inexpensive means has been provided which is mountable in a desired area so as to provide an efficient low cost means of automatically and effectively filtering impurities from the air. Applicant's device eliminates a great deal of time consuming, tedious, and expensive service work as the filtering units can be readily cleansed in conventional dishwashers.

I claim:
1. An electrostatic air filter structure adapted to be secured in a downwardly depending nature from a ceiling, comprising:
   (a) a housing means having a support base connectible to the ceiling, a plurality of downwardly depending sidewalls secured to said support base and forming the periphery of a multi-sided enclosure, said sidewalls each having an air inlet opening therein, a closure lid member pivotally connected at one of its side edges to one of said sidewalls and movable from open to closed positions to alternately reveal and conceal the entire area enclosed by said sidewalls,
   (b) a plurality of electrostatic precipitators connected to said housing means and within said enclosure, each said electrostatic precipitator having, in seires, adjacent a respective one of said inlet openings an ionizer unit and a particle collector unit and operatively associated with said respective inlet opening to receive air from said respective air inlet opening, there being one electrostatic precipitator for each said opening,
   (c) said ionizer units having a plurality of filament members extended across respective ones of said air inlet openings,
   (d) said collector units including a plurality of plate members having adjacent one separated by second grounded plates defining collecting zones, said plate members and said second grounded plates extended substantially parallel to each other and substantially transversely across its respective air inlet,
   (e) each said electrostatic precipitator having a leaf spring contact member engaged with said ionizer units and supplying electrical power thereto, a spring loaded contact engaged with said plate members and supplying electrical power thereto, and an electrical circuit means connecting said leaf spring contact member and said spring loaded contact of each electrostatic precipitator to a high voltage direct current power supply,
   (f) means connected to said housing means for releasably securing said ionizer units and said collector units therein, said lid member being movable to an open downwardly depending position for removal of said ionizer units and said collector units for repair and maintenance,
   (g) means connected to said housing for releasably securing said lid in closed position,
   (h) at least one of said lid member and said support base having an outlet opening therein, and
   (i) air flowing means for flowing air from said inlet openings, through said precipitators, and out said outlet opening.
2. An electrostatic air filter structure as described in claim 1, wherein:
   (a) each said precipitator has a pre-filter unit adjacent and extended across respective ones of said inlet sections and a conglomeration filter positioned adjacent and extended across the innermost side of respective ones of said collector units,
   (b) said securing means having a plurality of clip members engageable with said plates of said collector units releasably securing and grounding the same thereto,
   (c) said housing means having a plurality of closure grates mounted in covering relationship to respective ones of said air inlet openings, and
   (d) said electrical circuit means having a switch member in said circuit means mounted on said lid member operable to control operation of said air filter structure.
3. An electrostatic air filter structure as described in claim 2, including:
   (a) said outlet opening being in said lid member com- prising an enlarged air discharge opening and a grate member mounted across said air discharge opening, and (b) said air flowing means comprising fan means secured to said housing means and connected to said circuit means and pulling air through said air inlet openings from adjacent the ceiling about the periphery of said support base for exit through said air discharge opening.

References Cited

UNITED STATES PATENTS

| | | | |
|---|---|---|---|
| 2,021,437 | 11/1935 | Walsh | 55—471 X |
| 2,313,676 | 3/1943 | Shaver | 55—471 X |
| 2,486,521 | 11/1949 | Dahlman | 55—138 |
| 2,552,847 | 5/1951 | Farr et al. | 55—484 X |
| 2,629,587 | 2/1953 | Tignor | 55—222 |
| 2,639,781 | 5/1953 | Savitz | 55—139 X |
| 2,650,672 | 9/1953 | Barr et al. | 55—138 |
| 2,725,729 | 12/1955 | Mills. | |
| 2,780,305 | 2/1957 | Bonatz | 55—139 |
| 2,868,102 | 1/1959 | Melgaard | 98—40 X |
| 2,873,000 | 2/1959 | Elam | 55—138 |
| 2,932,359 | 4/1960 | Fields | 55—138 X |
| 2,933,158 | 4/1960 | Kauffman | 55—483 |
| 2,979,158 | 4/1961 | Vlier | 55—139 |
| 3,027,970 | 4/1962 | Mueller | 55—138 |
| 3,041,807 | 7/1962 | Getzin et al. | 55—143 |
| 3,064,409 | 11/1962 | Schmitt | 55—122 |
| 3,222,848 | 12/1965 | Koble | 55—139 X |
| 3,271,932 | 9/1966 | Newell | 55—138 X |
| 3,299,620 | 1/1967 | Hollingworth | 55—135 X |

HARRY B. THORNTON, *Primary Examiner.*

D. TALBERT, *Assistant Examiner.*

UNITED STATES PATENT OFFICE
CERTIFICATE OF CORRECTION

Patent No. 3,412,530                                      November 26, 1968

George H. Cardiff

It is certified that error appears in the above identified patent and that said Letters Patent are hereby corrected as shown below:

Column 6, line 58, "sections" should read -- openings --.

Signed and sealed this 10th day of March 1970.

(SEAL)
Attest:

Edward M. Fletcher, Jr.                              WILLIAM E. SCHUYLER, JR.
Attesting Officer                                             Commissioner of Patents